United States Patent
Jokinen et al.

(10) Patent No.: US 11,104,111 B2
(45) Date of Patent: Aug. 31, 2021

(54) LABEL LAMINATE AND A METHOD AND A SYSTEM FOR MANUFACTURING A LABEL LAMINATE

(75) Inventors: Risto H. Jokinen, Espoo (FI); Jorma Henttonen, Siivkkala (FI); Jan-Erik Forsstrom, Helsinki (FI); Sampo Pynnonen, Vuorentausta (FI); Kai Heinonen, Wroclaw (PL)

(73) Assignee: UPM RAFLATAC OY, Tampere (FI)

( * ) Notice: Subject to any disclaimer, the term of this patent is extended or adjusted under 35 U.S.C. 154(b) by 458 days.

(21) Appl. No.: 14/233,915

(22) PCT Filed: Jul. 10, 2012

(86) PCT No.: PCT/FI2012/050722
§ 371 (c)(1),
(2), (4) Date: Apr. 18, 2014

(87) PCT Pub. No.: WO2013/011194
PCT Pub. Date: Jan. 24, 2013

(65) Prior Publication Data
US 2014/0220287 A1    Aug. 7, 2014

(30) Foreign Application Priority Data
Jul. 20, 2011   (FI) ..................................... 20115764

(51) Int. Cl.
*B32B 37/00* (2006.01)
*B32B 37/12* (2006.01)
(Continued)

(52) U.S. Cl.
CPC ............ *B32B 37/025* (2013.01); *B32B 37/12* (2013.01); *B32B 37/26* (2013.01); *B32B 38/164* (2013.01);
(Continued)

(58) Field of Classification Search
CPC ..... B32B 38/10; B32B 38/145; B32B 38/164; B32B 2038/166; B32B 2037/1276;
(Continued)

(56) References Cited

U.S. PATENT DOCUMENTS 3,843,480 A    10/1974   Dreher et al.
4,035,218 A *   7/1977   Yount .................. D21H 27/001
                                                        156/289
(Continued)

FOREIGN PATENT DOCUMENTS

CN           1301376 A      6/2001
CN         101240153 A      8/2008
(Continued)

OTHER PUBLICATIONS

Sakarai, "JP 2001-054932, Machine Translation", published Feb. 27, 2001.*
(Continued)

*Primary Examiner* — Alex B Efta
(74) *Attorney, Agent, or Firm* — Cantor Colburn LLP (57) ABSTRACT

The invention relates to a method for manufacturing a label laminate. The method includes forming at least one water based adhesive layer on a belt, drying said at least one water based adhesive layer on the belt, unwinding a first material layer, unwinding a second material layer, attaching said at least one dried water based adhesive layer to the surface of the first material layer, and laminating the first material layer comprising at least one water based adhesive layer together with the second material layer in order to form the label laminate. The invention also relates to a label laminate and to a system for manufacturing a label laminate.

10 Claims, 2 Drawing Sheets

(51) Int. Cl.
*B32B 37/26* (2006.01)
*B32B 38/00* (2006.01)
*B32B 38/16* (2006.01)
*G09F 3/10* (2006.01)
*C09J 7/24* (2018.01)
*G09F 3/02* (2006.01)

(52) U.S. Cl.
CPC ............... *C09J 7/243* (2018.01); *G09F 3/10* (2013.01); *B32B 2037/1276* (2013.01); *B32B 2037/268* (2013.01); *B32B 2038/166* (2013.01); *B32B 2307/718* (2013.01); *B32B 2309/02* (2013.01); *B32B 2309/105* (2013.01); *B32B 2309/14* (2013.01); *B32B 2310/0454* (2013.01); *B32B 2310/0812* (2013.01); *B32B 2310/0825* (2013.01); *B32B 2310/0862* (2013.01); *B32B 2519/00* (2013.01); *C09J 2203/334* (2013.01); *C09J 2301/306* (2020.08); *G09F 2003/0222* (2013.01); *G09F 2003/0242* (2013.01); *G09F 2003/0255* (2013.01); *Y10T 156/16* (2015.01); *Y10T 156/1705* (2015.01); *Y10T 428/1476* (2015.01)

(58) Field of Classification Search
CPC . C09J 7/0207; C09J 7/02; C09J 7/0264; C09J 7/0246; C09J 7/0292; C09J 5/06; C09J 2203/334; G09F 3/02; G09F 2003/0241; G09F 2003/0257; G09F 2003/0229; G09F 2003/0255; G09F 2003/0242; G09F 3/10; B05C 1/0834; B05C 1/0821; B05C 1/0808; B05C 1/003; B05C 1/025; B05C 1/0826; B05C 1/14; B05C 1/16; B05C 9/14; B05D 5/10; B05D 3/10; B05D 3/14; B05D 3/02
See application file for complete search history.

(56) References Cited

U.S. PATENT DOCUMENTS

| | | | |
|---|---|---|---|
| 4,151,319 A | | 4/1979 | Sackoff et al. |
| 4,582,736 A | * | 4/1986 | Duncan ............... B29C 47/06 428/313.3 |
| 4,886,564 A | * | 12/1989 | Pagendarm ............ B05C 1/14 118/61 |
| 5,587,214 A | * | 12/1996 | Mitchell, Jr. ......... B31D 1/027 40/638 |
| 5,766,714 A | * | 6/1998 | Profetto ................ G09F 3/02 283/81 |
| 6,031,553 A | * | 2/2000 | Nagamoto ............. B41J 2/315 347/171 |
| 6,057,033 A | * | 5/2000 | Bilodeau ................ B32B 7/06 427/493 |
| 6,312,777 B1 | * | 11/2001 | Smith .................... B32B 37/24 156/152 |
| 6,406,244 B1 | * | 6/2002 | Le Riche .............. B42D 5/003 281/5 |
| 2004/0108055 A1 | * | 6/2004 | Franko, Sr. ........... B31D 1/021 156/267 |
| 2008/0187702 A1 | | 8/2008 | Ferenz et al. | |

FOREIGN PATENT DOCUMENTS

| | | | | |
|---|---|---|---|---|
| CN | 103857527 A | | 6/2014 | |
| DE | 1 752 337 | | 5/1971 | |
| DE | 3606199 A1 | * | 8/1987 | ............... C09J 7/02 |
| FI | 118998 B | | 6/2008 | |
| FR | 1.598.777 | | 7/1970 | |
| FR | 159777 A | * | 7/1970 | ............... B05C 1/14 |
| GB | 2 121 353 A | | 12/1983 | |
| JP | A-05-311132 | | 11/1993 | |
| JP | 06158001 A | * | 6/1994 | |
| JP | 06158001 A | * | 6/1994 | |
| JP | 2001054932 A | * | 2/2001 | |
| WO | WO 98/03958 | | 1/1998 | |
| WO | 9949440 A1 | | 9/1999 | |
| WO | WO 2004/087827 A1 | | 10/2004 | |
| WO | 2013011195 A1 | | 1/2013 | |

OTHER PUBLICATIONS

Pagendarm, "DE 3606199, machine translation", published Aug. 27, 1987.*

Pagendarm, "FR 1598777, machine translation", published Jul. 6, 1970.*

JP 06-158001, A, machine translation, published Jun. 7, 1994 (Year: 1994).*

Dec. 21, 2012 International Search Report issued in International Application No. PCT/FI2012/050722.

May 10, 2012 Finnish Search Report issued in Finnish Application No. 20115764.

May 27, 2015 Search Report issued in European Patent Application No. 12815513.2.

Dec. 25, 2014 Office Action issued in Chinese Patent Application No. 201280035753.5.

* cited by examiner

LABEL LAMINATE AND A METHOD AND A SYSTEM FOR MANUFACTURING A LABEL LAMINATE

FIELD OF THE INVENTION

This invention relates to a label laminate. In addition, this invention relates to a method for manufacturing a label laminate. The invention further relates to a system for manufacturing a label laminate.

BACKGROUND OF THE INVENTION

A label laminate typically comprises a face layer and a release liner, which are laminated together. There is usually an adhesive layer between the release liner and the face layer. When the label laminate is used, the face layer can be attached to another surface thanks to the adhesive layer that is attached onto the face material. The release liner is mainly used to protect the adhesive layer.

SUMMARY OF THE INVENTION

It is an object of the present invention to provide a label laminate. Another object of the present invention is to provide a method and a system for producing a label laminate.

Plastic films are wanted to use as a raw material for label laminates. However, plastics may shrink easily if the temperature is increased during the manufacturing process of the label laminate. Thus, many plastics, such as polypropylene or polyethylene, cannot be used with water based adhesives due to the necessary drying step of said water based adhesives. Therefore, an object of one embodiment of the invention is to provide a label laminate having water based adhesive layer(s) on a first material layer comprising at least one plastic film layer. Preferably at least one water based adhesive layer is attached to the surface of the plastic film layer.

It was surprisingly found by the inventors of the present invention that it is possible to use a belt, preferably a metal belt, to dry at least one water based adhesive layer. Thanks to the belt used in this invention, the water based adhesion layer can be formed and dried before the water based adhesion layer is attached to a surface of a first material layer, preferably to the surface of a face layer. Therefore, it may be possible to avoid shrinking and/or stretching of the first material layer comprising heat sensitive plastic film that may otherwise be caused by the temperature and the tension needed for the drying process of the water based adhesives. In other words, the dimensions of the release liner and/or the face layer in the first direction, i.e. in the machine direction, preferably do not change more than 3%, more preferably not more than 2% or most preferably not more than 1% during the manufacturing process according to the invention. In addition, the dimensions of the release liner and/or face layer in the second direction, i.e. in the cross direction, preferably do not change more than 1% during the manufacturing process according to the invention.

The belt used for the drying process may be, for example, a silicone belt or a plastic belt such as a nylon belt. The belt is preferably a metal belt, such as a steel belt. Most preferably, the belt used in this invention has at least one release coating layer in order to increase the release effects of the belt. Said at least one release coating layer preferably comprises at least one silicone coating layer.

Aspects of the invention are characterized by what is stated in the independent claims. Various embodiments of the invention are disclosed in the dependent claims.

The water based adhesive layer may be dried, for example, by an induction heating device and/or by an infrared heating device and/or by a microwave heating device and/or by air dryers. If the belt is a metal belt, it is preferably heated from the first side of the metal belt (i.e. underneath/from the belt side) by induction energy or by infrared (IR) energy, such as gas IR energy or electrical IR energy. It is also possible to heat the metal belt, in addition to or instead of the above mentioned ways, from the second side of the metal belt (i.e. from the side where said at least one water based adhesion layer is placed), for example by infrared energy.

In addition to or instead of the above mentioned devices, at least one microwave heating device may be used to heat said at least one water based adhesive layer. In this case, at least one microwave heating device is advantageously placed on the second side of the belt (i.e. the side where said at least one water based adhesive layer is placed) in order to heat said at least one water based adhesive layer directly.

In addition to or instead of the above mentioned devices, air jets may be used to remove moisture from said at least one water based adhesive layer. In this case, the air jets are preferably placed on the second side of the belt (i.e. the side where said at least one water based adhesive layer is placed).

Advantageously, the method for manufacturing a label laminate comprises
forming at least one water based adhesive layer on a belt,
drying said at least one water based adhesive layer on the belt,
unwinding a first material layer,
unwinding a second material layer,
attaching said at least one dried water based adhesive layer to the surface of the first material layer, and
laminating the first material layer comprising at least one water based adhesive layer together with the second material layer in order to form the label laminate.

Preferably, the method further comprises:
removing moisture from said at least one water based adhesive layer by using at least one air dryer.

Advantageously, the second material layer is laminated in a laminating nip together with the first material layer having the at least one water based adhesive layer in such a way that the label laminate comprises the water based adhesive layer between the first material layer and the second material layer.

Preferably, the first material layer comprises at least one plastic layer. Preferably the plastic film is oriented from 5 to 8 times in the machine direction. In addition or alternatively, the second material layer has preferably at least one plastic film, which is preferably oriented from 5 to 8 times in the machine direction. Advantageously, the first material layer is a face layer and that the second material layer is a release liner. The release liner comprises preferably at least one backing material layer, which is coated with at least one release coating layer.

Preferably, the belt is a metal belt. The belt has preferably at least one release coating layer. Preferably, the heating of the belt is at least partly based on induction heating. Alternatively or in addition, the heating of the belt is at least partly based on infrared heating. Said infrared heating is preferably implemented by a gas infrared heating device.

Advantageously, the first material layer comprises at least one of the following plastic films:
polypropylene (PP) film, polyethylene (PE) film, and
polyethylene terephthalate (PET) film.

Preferably, the first material layer comprises at least one polypropylene (PP) film and/or at least one polyethylene (PE) film. The amount of the polypropylene (PP) in the first material layer is preferably at least 50 w-%.

Advantageously, the system for manufacturing a label laminate comprises:
- a belt for receiving at least one water based adhesive layer,
- a coating unit for forming at least one water based adhesive layer on the belt,
- means for drying said at least one water based adhesive layer on the belt,
- a first unwinder for unwinding a second material layer,
- a second unwinder for unwinding a first material layer,
- means for attaching said at least one dried water based adhesive layer to the first material layer, and
- means for laminating the first material layer comprising said at least one water based adhesive layer together with the second material layer in order to form the label laminate.

The belt is preferably a metal belt. Preferably, the belt comprises at least one release coating layer.

Advantageously, the means for drying the at least one water based adhesive layer comprise an induction heating device in order to heat the belt and to remove moisture from said at least one water based adhesive layer on the belt. Alternatively or in addition, the means for drying said at least one water based adhesive layer comprise an infrared heating device in order to remove moisture from said at least one water based adhesive layer on the belt. Alternatively or in addition, the means for drying said at least one water based adhesive layer preferably comprise at least one air dryer in order to remove moisture from said at least one water based adhesive layer on the belt.

Advantageously, the label laminate comprises a first material layer and a second material layer, which layers are laminated together and have at least one water based adhesive layer between them. The first material layer is preferably a release liner comprising at least one backing material layer comprising at least one polyethylene (PE) and/or polypropylene (PP) plastic film layer, and at least one release coating layer, which release coating layer is in contact with the at least one water based adhesive layer.

Preferably, a thickness of the release liner is between 15 and 60 microns.

Preferably, the second material is a face layer comprising at least one polyethylene (PE) and/or polypropylene (PP) plastic film layer.

Thanks to the present invention in which said at least one water based adhesive layer is dried separately before it is attached to the first material layer comprising a plastic film, it is possible to avoid so called skinning of the water based adhesive layer on the surface of the plastic film, which skinning typically traps the moisture in the adhesive and slows down the drying process of the water based adhesive.

Moreover, it is possible, for example, to coat the face layer of the label laminate with said at least one layer of water based adhesive, even if the face material comprises heat sensitive material, such as polypropylene or polyethylene film layer(s).

It is a further advantage that the label laminate may be environmentally friendly. The label laminate may be recyclable and may be reused, for example in products such as in injection moulded plastic articles.

The manufactured labels may be die-cut and later applied onto the surface of items, such as bottles or other containers.

DESCRIPTION OF THE DRAWINGS

In the following, the invention will be illustrated by drawings in which.

DETAILED DESCRIPTION OF THE INVENTION

The following reference numbers are used in this application:
1 label laminate,
2 release liner,
3 backing material layer,
4 face layer,
5 release coating layer,
6 adhesive layer,
10 belt,
10a first side of the belt,
10b second side of the belt,
22 first unwinder,
12 second unwinder,
13 laminating nip,
14 rewinder of the label laminate,
15 coating unit,
20 heating device, and
21 air dryer.

In this application the term "label laminate" 1 refers to so called pressure sensitive label laminates and self-adhesive label laminates. Advantageously the label laminate 1 comprises two layers which are laminated together, i.e. a release liner 2 and a face layer 4, wherein an adhesive layer 6 is provided between the release liner 2 and the face layer 4. During the manufacturing process of the label laminate 1, the adhesive layer 6 is attached to the first material layer.

The term "first direction" refers to the machine direction, i.e. to the longitudinal direction.

The term "second direction" refers to the cross direction, i.e. to the transverse direction.

The term "face layer" 4 refers to "the top layer" of the label laminate, also called as the face stock. The face layer 4 comprises at least one layer that is attached to another surface with at least one adhesive layer 6, when the label laminate 1 is used. The face layer 4 may consist of plastic film layer(s), for example, polypropylene or polyethylene film layer(s). The product consisting of the face layer(s) 4 and the adhesive layer(s) 6 is called as linerless label. In other words, it is not same product as the label laminate 1, which also comprises the release liner.

The term "label" refers to a die-cut face layer comprising a water based adhesive layer.

The term "release liner" 2 refers to a structure comprising at least one backing material layer 3 as base material and at least one release coating layer 5 on the backing material layer 3. In other words, the backing material layer 3 is usually coated with a thin layer of release agent, such as silicone. Therefore, the release liner 2 can be easily removed from the face layer 4 when the label is adhered to a substrate.

The release liner may consist of plastic film layer(s), such as polypropylene or polyethylene film layer(s). The release liner 2 is used to protect the adhesive layer 6 of the label laminate 1 and to allow efficient handling up to the point where the label is dispensed and adhered to a substrate surface.

The term "first material layer" refers to a material layer to be coated. In other words, according to the present invention said at least one water based adhesive layer is applied onto the surface of the first material layer.

The term "second material" refers to a material that is laminated together with the first material layer having said at least one water based adhesive layer on its surface in order to form the label laminate (1).

The present invention comprises a solution in which a belt 10, preferably a metal belt, is used to dry at least one water based adhesive layer 6 on the belt 10, after which drying process said at least one water based adhesive layer is added to the first material layer, preferably to the face layer 4. The drying process of said at least one water based adhesive layer 6 is implemented before said at least one water based adhesive layer is attached to the first material layer. Therefore, the heating process of the water based adhesive layer may not have any effect on the first material layer. Thus, the first material layer may comprise very heat sensitive materials.

Water based adhesives may comprise, for example, acrylic dispersions and/or tackifier resins together with additives, such as a wetting agent, a defoamer etc.

Figure 1:
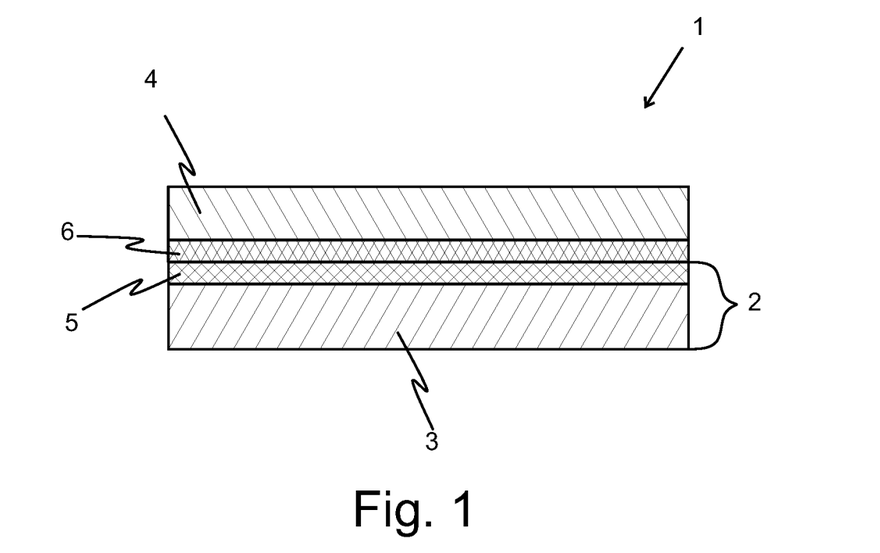
FIG. 1 shows an example embodiment of a label laminate produced according to the invention.

FIG. 1 presents an example embodiment of the label laminate 1. The label laminate 1 presented in FIG. 1 comprises a face layer 4, a release liner 2 and a water based adhesive layer 6 between said layers. The water based adhesive layer 6 is attached on the first material layer. Preferably, the water based adhesive layer(s) is attached to the surface of the first material before the laminating step of the first material layer and the second material layer.

The label laminate 1 preferably consists of the release liner 2 and the face layer 4, which are laminated together with the water based adhesive layer(s) 6 between them. After removal of the release liner 2, the label can be attached to the surface of an item through said at least one adhesive layer.

Figure 2:
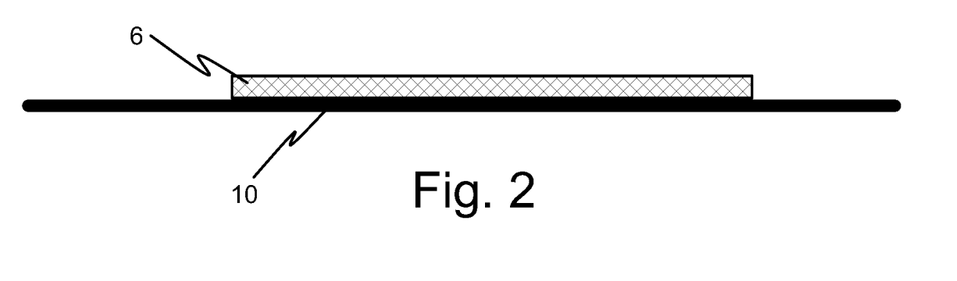
FIG. 2 shows an example embodiment of a water based adhesive layer on a belt.
Figure 3:
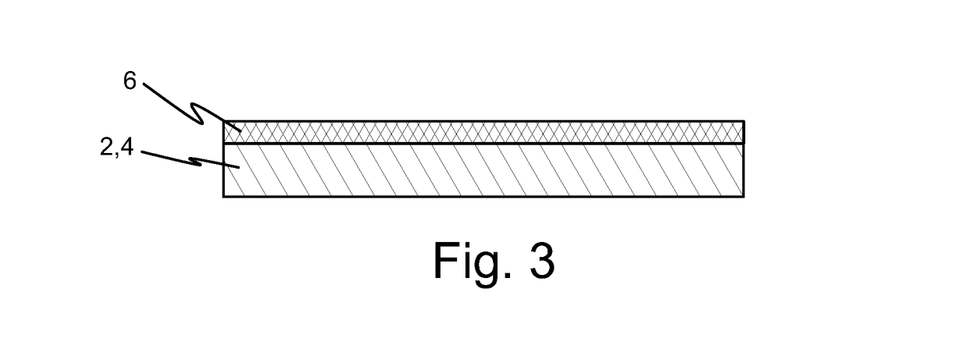
FIG. 3 shows an example embodiment of a first material layer with a water based adhesive layer.
Figure 4:
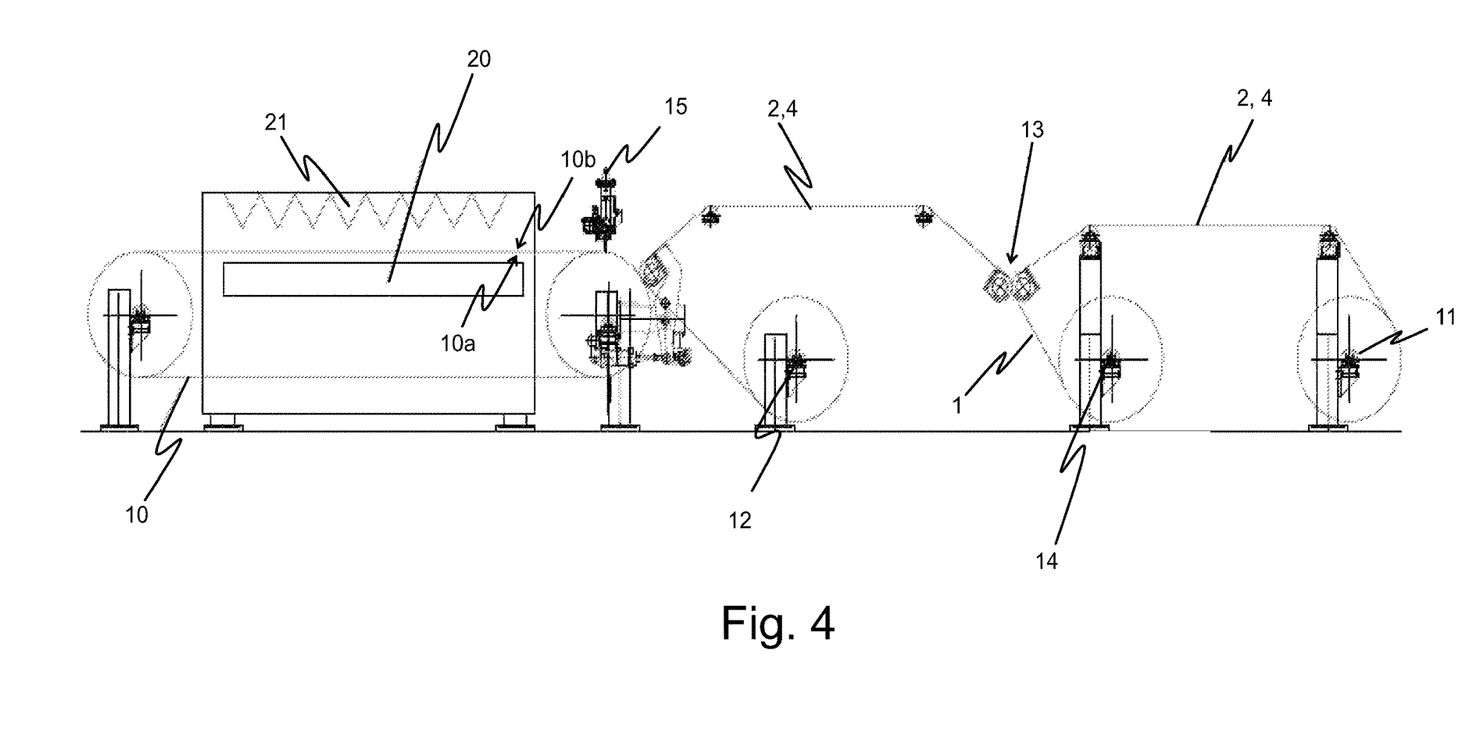
FIG. 4 shows an example embodiment of the system.

FIG. 2 presents an example embodiment of the water based adhesive layer 6 on the belt 10. FIG. 3 presents an example embodiment of the first material layer, preferably the face layer 4, having at least one adhesive layer 6 on the first material layer. FIG. 4 presents an example embodiment of the system.

Due to the novel solution, it is possible to manufacture a label laminate 1 having at least one water based adhesive layer 6 on the first material layer, preferably on the face layer 4, which layer preferably comprises at least one polypropylene or polyethylene film.

The backing material layer 3 and/or the face layer 4 may consist of a monolayer film, also called a single layer film. The backing material 3 and/or the face layer 4 may alternatively comprise a multilayer plastic film structure comprising two or more layers. In that case, the multilayer structure may comprise individual plastic film layers having different compositions, or alternatively all layers may have the same composition. The monolayer film may be, for example, blown or cast. The multilayer film may be, for example, coextruded, or at least two monolayer films may be laminated together.

The face layer(s) 4 and/or the backing material layer(s) 3 may be partially or totally oriented monoaxially in the machine direction or biaxially, or it may be non-oriented.

According to an example embodiment of the invention, the backing material layer(s) 3 and/or the face layer(s) 4 has at least one plastic film that is oriented from 5 to 8 times in the machine direction.

A wide variety of plastic polymer film materials are useful for the face layer 4. The polymer film may include homopolymers, copolymers or it may be a polymer blend. For example, the film(s) may comprise polyethylene, polypropylene, polystyrene, polyester, or mixtures thereof. The polymer film(s) may also be degradable and/or derived from renewable sources, such as cellulose or lactic acid based polymer. The face layer 4 preferably comprises polypropylene or polyethylene. Polypropylene may be oriented, for example biaxially oriented, polypropylene (BOPP).

In some applications, more than one separate layers consisting of different polymers may be beneficial for the face layer 4, and permit use of different type of printing methods and/or inks and allow excellent printing properties for the label laminate 1. The face layer 4 may comprise at least one, at least three, at least five or at least seven separate layers, and at most 9, at most 7, at most 5 or at most 3 separate layers, which layers consist of films of different polymers. The number of the polymer layers is preferably odd.

The face layer 4 may have thickness of at least 20 microns, for example at least 30 or 40 microns, and preferably at most 100 microns, more preferably at most 90, 85 or 80 microns. According to an example embodiment, the thickness of the face material is between 20 and 90 microns.

The face layer 4 may comprise a clear plastic film structure providing a no-label look appearance. The clear plastic film structure is substantially transparent to visible light. Haze of the face layer 4 is preferably at most 25% or at most 20%, more preferably at most 15%, at most 10% or at most 8%. The clear no-label look of the face stock allows the objects beneath such layer, i.e. the bottle or contents, to be visible through such layer.

The backing material 3 preferably comprises a plastic film (polymeric film), such as polypropylene (PP), polyethylene (PE) or polyethylene terephthalate (PET) in order to achieve a smooth film backing that provides a smooth adhesive layer 6 in order to form a uniform contact with the substrate being labelled. An advantage of the plastic film is the smoothness of the surface compared to conventional paper liners. Smooth surface of the plastic film used will further provide smoothness of the adhesive coating transferred to the face layer 4. Smooth adhesive layer 6 is beneficial, for example, when clarity of transparent labels is preferred. The backing material 3 comprising or consists of plastic film(s) may also have better mechanical properties than the backing material 3 comprising paper materials, which is an advantage in automatic labelling lines where the machines must dispense and apply labels at high speed. Plastic release liners 2 have, for example, reduced occurrence of liner breakages and, thus, fewer productivity losses on the dispensing and bottling lines.

According to an advantageous embodiment of the invention, the backing material layer 3 comprises polyethylene or polypropylene, for example polypropylene homopolymer, as a main component (i.e. more than 50 w-% of the backing material layer). The release liner 2 may have a thickness of, for example, between 15 and 60 microns. Thickness of the backing material 3 is preferably at least 12 microns, more preferably at least 15 or at least 20 microns. In addition, the thickness of the backing material may be not greater than 50 microns, more preferably not greater than 35 or 30 microns.

According to an example embodiment of the invention, the thickness of the backing material is between 15 and 35 microns.

According to an advantageous embodiment, polypropylene is used as a raw material for at least one face layer 4. Polypropylene film is usually a cheaper solution compared, for example, to glassine liners. Now, thanks to the new invention, it is possible to use polypropylene film together with the water based adhesives. Thanks to the present invention, it may also be possible to speed up the drying process of the water based adhesives and to avoid inducing a varying degree of stretching and/or shrinking in the polypropylene film during the drying process of the water based adhesive(s). If the polypropylene is used in the face layer 4, the polypropylene film may be oriented. According to an advantageous embodiment of the invention, a release liner is provided which comprises at least one plastic film oriented in the machine direction.

The backing material layer 3 is preferably coated with release agent in order to form at least one release layer 5. The at least one release layer 5 is used in order to achieve a release effect for the release liner 2 against the adhesive layer 6. The release agent is applied onto the upper side of the backing material 3. The release coating has to be made of a material that has a low surface energy.

The release coating advantageously comprises silicone, such as crosslinkable silicone. The chemistry of the silicone defines the force required to release the adhesive (and therefore the face layer) from the backing. The release coating layer 5 may consist of silicone. The amount of the silicone on the release layer may be, for example, between 0.3 and 1.5 g/m$^2$, or between 0.6 and 1.2 g/m$^2$ (dry grammage). The silicone coating used is preferably recyclable. The release agent used in the release liner may be, but is not limited to, a one-part or two-part silicone system, preferably a 3 to 5 part silicone system. The silicone may be, for example, UV curable. UV curable silicone may be most preferably used because it may allow the use of lower temperatures for the curing process of the silicone.

The release liner 2 may also comprise other components, such as hydrocarbon resin and/or mineral fillers. For example, at least one kind of filler may be used in the backing material 3. If a filler is used, the amount of the filler may be from 2 to 30 weight-% based on the total weight of the backing material 3. Addition of the filler may increase the heat stability and/or the mechanical stability of the backing material 3. A certain degree of heat stability is required, for example, during the printing and die-cutting operation when the label laminate may reach a temperature of 50 to 60° C. If the resin is added, the amount of the resin is preferably at least 2 w-%, at least 3 w-%, or at least 5 w-%, and preferably at most 20 w-%, more preferably at most 10 w-%, at most 8 w-% or at most 5 w-%.

When the label laminate 1 is used, the adhesive layer 6 bonds the label to the surface of an item. The structure of the label may have one adhesive layer, or a multilayer adhesive structure including additional adhesive layer(s). The adhesive layer is applied on the face layer 4 and/or on the release liner 2 during the manufacturing process. The adhesive layer 6 of the produced label laminate 1 may have a thickness of at least 10 or 12 microns, preferably at least 14 or 16 microns, and not greater than 40 or 35 microns, preferably not greater than 30, 25 or 20 microns. The thickness of the adhesive layer may be, for example, between 16 and 20 microns. The amount of the water based adhesive may be, for example, 16 to 22 g/m$^2$ (dry grammage). The adhesive layer 6 preferably comprises a water based adhesive layer(s).

The solid content of the water based adhesive to be applied on the belt 10 is preferably between 30 and 80 w-% or between 40 and 70 w-%, more preferably between 45 and 65 w-% or between 50 and 60 w-% and most preferably between 53 and 58 w-%. The solid content of said at least one dried water based adhesive layer in the end of the belt 10 (after the drying process, when the at least one water based adhesive layer is attached to the surface of the first material layer), is typically at least 90%, or 93%, preferably at least 95%. The solid content of the water based adhesive layer of the manufactured label 1 is typically at least 95%. The water based adhesive used is advantageously environmentally friendly.

According to an advantageous embodiment of the present invention, the water based adhesive layer(s) 6 is dried at least partially indirectly by using a heated metal belt. The metal belt 10 may comprise good mechanical properties together with a good specific heat capacity. It is possible to heat the metal belt 10 from one side in order to heat the product on the other side of the metal belt.

In the case of the metal belt 10, the belt 10 is preferably heated by induction heating or by infrared heating, such as gas IR heating or electrical IR heating. Thanks to the metal belt 10, it is possible to control the temperature accurately. Moreover, the warming of the metal belt can be very effective due to the induction heating and/or gas IR heating; hence, the amount of the energy needed for the drying process may substantially decrease.

The length of the belt 10, the speed of the belt and the temperature of the belt are controlled in order to dry the water based adhesive layer. The length of the belt contacted with said at least one water based adhesive layer is preferably at least 10 m, or at least 20 m, and not greater than 50 or 40 m, or not greater than 35 or 30 m. The length of the belt may be, for example, between 20 and 40 m. The speed of the belt is preferably between 300 and 1200 m/min. The temperature of the water based adhesive layer is preferably at least 65, 70 or 75° C., and preferably not higher than 90, 85, or 80° C., when the water based adhesive layer is removed from the belt 10 in order to attach it to the surface of the first material layer. Said at least one water based adhesive layer is preferably in contact with the belt for at least 1 s. or 1.5 s., advantageously for at least 1.8 s. or for at least 2.0 s, and preferably not longer than for 3.5 s, more preferably not longer than for 3.0 s. or 2.5 s.

If the metal belt is used, the thickness of the metal belt (10) may be, for example, between 0.2 and 4 mm, more preferably between 1 and 2 mm. The density (at 20° C.) of the metal belt (10) is preferably between 7500 and 8500 kg/m$^3$, more preferably between 7700 and 8050 kg/m$^3$. The thermal conductivity (at 20° C.) may be, for example, between 13 and 21 W/mK, for example between 14 and 15 W/mK. The thermal conductivity (at 100° C.) may be, for example, between 14 and 22 W/mK, for example between 15 and 16 W/mK. The temperature of the used belt during the drying process is advantageously at least 70, 75 or 80° C., and not higher than 125, 120, or 115° C.

The drying of said at least one water based adhesive layer is preferably implemented by one, two, three or four of the following kinds of devices:
  induction heating device(s),
  infrared heating device(s),
  microwave heating device(s), and
  air jet(s).

The heating device 20, 21 used may heat the water based adhesive layer directly or indirectly, i.e. by first heating a belt which transfers heat to the material to be heated.

However, due to the device(s) preferably used for the heating, both solutions give great possibilities to have an exactly correct temperature profile in relation to the time of the heating. Thus, the time and energy needed for the drying of the water based adhesive(s) may be reduced by the new method.

An induction heating process may be used for heating said at least one water based adhesive layer indirectly via the belt 10, preferably via the metal belt. The induction heating is a high frequency electrical heating process that allows the targeted heating of the water based adhesive layer on the plastic film. The induction heating is a process for heating an electrically conducting object, in this case preferably the metal belt 10, by induction. The frequency of an electromagnetic field used for heating depends on the object size, material type, coupling efficiency, and the electromagnetic field penetration depth. The induction heating offers a good combination of speed, consistency and control. With the induction heating, heat is induced within the part itself by circulating electrical currents. The process may be very repeatable and controllable. The induction heating can be controlled through the choice of induction frequency, power density and interaction time.

The induction heating may allow a very accurate temperature control in order to be able to maximize the drying temperature used. It may be possible to use a higher drying temperature, which together with the lack of skinning of the adhesive surface can significantly speed up the drying process and improve the adhesive performance. In addition, because of the heating of the metal belt instead of the heating of ambient air, the energy needed for the drying process may be significantly lower than with conventional heating processes.

An infrared heating process, such as an infrared gas heating process, may be used instead of the induction heating process or together with the induction heating process for heating the metal belt 10. The infrared heater, which transfers energy through electromagnetic radiation, may heat the water based adhesive layer both directly and indirectly. The efficiency of the infrared heater depends on matching the emitted wavelength and the absorption spectrum of the material to be heated. The wavelength used for the heating is preferably in a so called medium wave IR range, for example between 2 and 4 micrometers. The infrared gas heating device may use, for example, natural gas or propane as fuel gas.

In any case, air jets may be used to remove moisture from the water based adhesive layer(s). The air jets are preferably placed on the second side of the belt (i.e. on the side the at least one water based adhesive layer is placed).

If the belt used is a metal belt, preferably a steel belt, it has advantageously at least one release coating layer. Said at least one release coating layer preferably comprises at least one, advantageously exactly one or two, of the following layers:
- at least one silicone coating layer, and
- at least one fluoropolymer-based coating layer, such as at least one of the following:
  - PTFE (polytetrafluoroethylene) coating layer,
  - FEP (fluorinated ethylene propylene) coating layer, and
  - PFA (perfluoroalkoxy) coating layer.

Thanks to said at least one release coating layer on the belt, preferably on the metal belt, the dried water based adhesive layer may be easily released from the belt in order to attach it to the surface of the first material layer, preferably to the surface of the face layer 4.

The system according to the present invention preferably comprises at least one unwinder 11, 12 for the release liner 2, and at least one unwinder 11, 12 for the face layer 4. In addition, the system preferably comprises a coating unit 15 for the application of the water based adhesive(s). The coating is preferably a so called curtain coating process. Advantageously, the coating is a multilayer curtain coating process.

The first unwinder 11 is used for the second material layer to be laminated in a laminating nip 13 together with the first material layer having at least one water based adhesive layer. The second unwinder 12 is used for the first material layer.

According to the invention, the first material layer (preferably face layer) to be coated is unwound by the second unwinder 12. Said at least one water adhesive layer 6 is applied onto the belt 10, after which it is dried by at least one heating device 20, 21 such as an infrared heating device, an induction heating device and/or a microwave heating device, and/or an air dryer. After the drying step, said at least one dried water based adhesive layer having preferably a solid content of at least 95% is attached to the first material layer 2,4, such as the face layer 4. The first material layer with said at least one dried water based adhesive layer and the second material layer are laminated in a laminating nip 13 in order to form a label laminate 1.

The system may also comprise a cooling cylinder which is placed, for example, before the point wherein the dried at least one water based adhesive layer is attached to the first material layer. The speed of the rollers 11, 12, 14 in the system is preferably substantially same in order not to stretch the plastic film(s) used for the release liner 2 and/or the face layer 4. In other words, the speed difference between the rollers 11, 12, 14 is preferably not higher than 0.5%.

The first material layer is most preferably the face layer 4, and the second material layer is most preferably the release liner. According to an example embodiment, the first material layer is the release liner and the second material layer is the face layer.

The solution according to the present invention gives great possibilities to have an exactly correct temperature profile in relation to the time of the heating. Due to the present invention, it is possible to use a higher drying temperature in order to decrease the necessary drying time of said at least one water based adhesive layer. In other words, the time and the energy needed for the drying step of the water based adhesive may be reduced by the present invention.

This invention is, in principle, usable in any label laminate applications in which the material has to be dried. The total label laminate structure may also comprise other layers in order to improve the properties, such as label laminate functionality, conformability, printability, die-cutting, mechanical properties, or visual appearance. For example, a tie layer, a top coat or an over-laminate may be applied onto the face layer for protection or to enhance the adhesion of ink and/or adhesive, or to modify the water permeability.

Advantageously, thickness of the backing material 3 is between 15 and 35 microns, more preferably between 20 and 30 microns. The backing material 3 may comprise at least three layers. In this case, there are preferably two outermost layers of the backing material, and at least one layer is between the outermost layers of the backing material. The outermost layers of the backing material preferably contain PP-liner, which preferably contain PP-homopolymer, PP-copolymer or mixtures of these. The at least one layer between the outermost layers, i.e. so called core-layer, may contain PP-liner, which preferably contains PP-homopolymer, PP-copolymers, blends of these, or blends of these with hydrocarbon resin.

The release liner 2 preferably contains PP-homopolymer, PP-copolymers, blends of these, or blends of these with hydrocarbon resin. Advantageously, the release liner is biaxially oriented or mono-axially-oriented. Advantageously, the release liner is oriented in such a way, that the release liner is oriented at least 3 times, preferably from 3 to 9 times, from 4 to 8 times or from 5 to 7 in the machine direction (MD).

Advantageously, the amount of the PP and/or PE, most preferably the amount of the PP, is at least 50%, or at least 60%, more preferably at least 70% or at least 80%, and most preferably at least 90% calculated from the total weight of the release liner 2.

Advantageously, thickness of the release liner 2 is between 5 and 60 microns, more preferably between 10 and 40 microns, and most preferably between 15 and 35 microns. The release liner may have, for example, one, two, three, four, five, six or seven layers.

Advantageously, the face layer 4 comprises or consists of a polyethylene film or a polypropylene film, or a film that comprises or consists of polyethylene and polypropylene. In the case of the polypropylene film, the polypropylene film is preferably non-oriented or oriented in one or both directions.

Advantageously, the amount of the PP and/or PE, most preferably the amount of the PP, is at least 50%, or at least 60%, more preferably at least 70% or at least 80%, and most preferably at least 90% calculated from the total weight of the face layer.

Advantageously, the first material layer is coated with at least one water based adhesive layer by a contactless method, preferably by a curtain coating method. The curtain coating method and other contactless methods have the advantage that the coating process is non-statical, i.e. the coating method is substantially pressureless. In addition, the adhesive layer follows the contour of the base surface, i.e. the thickness of the coating layer remains unaltered.

Advantageously, the first material layer is coated with at least one water based adhesive layer by using the curtain coating method. The quantity of the water based adhesive layers may vary. Preferably there are 1, 2, 3, 4, 5 or 6 water based adhesive layers on the first material layer, more preferably 1, 2 or 3 water based adhesive layers on the first material layer. Advantageously, every adhesive layer is formed in a same curtain coating procedure. The total amount of the adhesive on the first material layer is preferably between 5 and 40 $g/m^2$, more preferably between 10 and 30 $g/m^2$, and most preferably between 10-20 $g/m^2$.

The speed of the belt is preferably at least 280 m/min, more preferably at least 300 m/min or at least 320 m/min, and most preferably at least 350 m/min or at least 370 m/min.

The first material layer may easily stretch in high temperatures. Therefore, the temperature of the first material layer, during steps of the method according to the present invention, is preferably less than 80° C., more preferably less than 70° C. or less than 60° C. and most preferably less than 50° C. or less than 40° C.

One skilled in the art readily understands that the different embodiments of the invention may have applications in environments where optimization of making a label laminate is desired. It is also obvious that the present invention is not limited solely to the above-presented embodiments, but it can be modified within the scope of the appended claims.

The invention claimed is:

1. A method for manufacturing a pressure sensitive label laminate comprising at least one pressure sensitive adhesive layer laminated between a first material layer and a second material layer, the method comprising:
   forming at least one water based adhesive layer comprising moisture on an endless metal belt,
   drying said at least one water based adhesive layer at least partially by heating the endless metal belt to a temperature between 70° C. and 125° C. to remove moisture from said at least one water based adhesive layer to form at least one dried pressure sensitive adhesive layer on the endless metal belt wherein the water based adhesive layer is in contact with the endless metal belt at least 1 second and; not longer than 3.5 seconds, wherein trapping of the moisture in the adhesive is avoided,
   maintaining the temperature of the endless metal belt between 70° C. and 125° C. during the drying;
   unwinding a first material layer, wherein the first material layer comprises at least one plastic film layer,
   unwinding a second material layer,
   attaching said at least one dried water based adhesive layer to the surface of the first material layer comprising the at least one plastic film layer, wherein temperature of the dried pressure sensitive adhesive layer is in a range between 65° C. and 90° C. when the dried adhesive layer is removed from the endless belt and attached to the surface of the first material layer, and
   laminating the first material layer comprising the dried at least one water based adhesive layer together with the second material layer in order to form the pressure sensitive label laminate comprising the at least one dried pressure sensitive adhesive layer laminated between the first material layer and the second material layer; and
   maintaining a temperature of the first material layer under 80° C. during the unwinding, attaching and laminating phases;
   wherein shrinking and stretching of the first material layer is avoided so that the dimensions of the first material layer do not change more than 3% in the machine direction during the manufacturing process of the pressure sensitive label laminate, and
   shrinking and stretching of the second material layer is avoided so that the dimensions of the second material layer do not change more than 3% in the machine direction during the manufacturing process of the pressure sensitive label laminate,
   wherein the first material layer or the second material layer is a release liner comprising at least one backing material layer, which is coated with at least one release coating layer comprising silicone.

2. The method according to claim 1, wherein the first material layer comprises at least one plastic film that is oriented from 5 to 8 times in a longitudinal direction.

3. The method according to claim 1, wherein the first material layer is a face layer and that the second material layer is a release liner.

4. The method according to claim 1, wherein the second material layer comprises at least one plastic film layer.

5. The method according to claim 4, wherein the second material layer has at least one plastic film that is oriented from 5 to 8 times in a longitudinal direction.

6. The method according to claim 1, wherein the drying of said at least one water based adhesive layer is at least partly based on at least one of induction heating, infrared heating and air dryer.

7. The method according to claim 1, wherein the first material layer comprises at least one of the following plastics:
- polypropylene (PP),
- at least one polypropylene (PP) film,
- polyethylene (PE),
- at least one polyethylene (PE) film, and
- polyethylene terephthalate (PET).

8. The method according to claim 1, wherein the first material layer comprises polypropylene and the amount of the polypropylene (PP) in the first material layer is at least 50 wt %.

9. The method according to claim 1, wherein the belt has at least one release coating layer.

10. The method according to claim 1, wherein the second material layer is laminated in a laminating nip together with the first material layer having the at least one dried water based adhesive layer in such a way that the label laminate comprises the at least one dried water based adhesive layer between the first material layer and the second material layer.

\* \* \* \* \*